Jan. 15, 1924.
D. PEPPER
ELECTRIC BATTERY
Filed Aug. 7, 1922
1,481,145
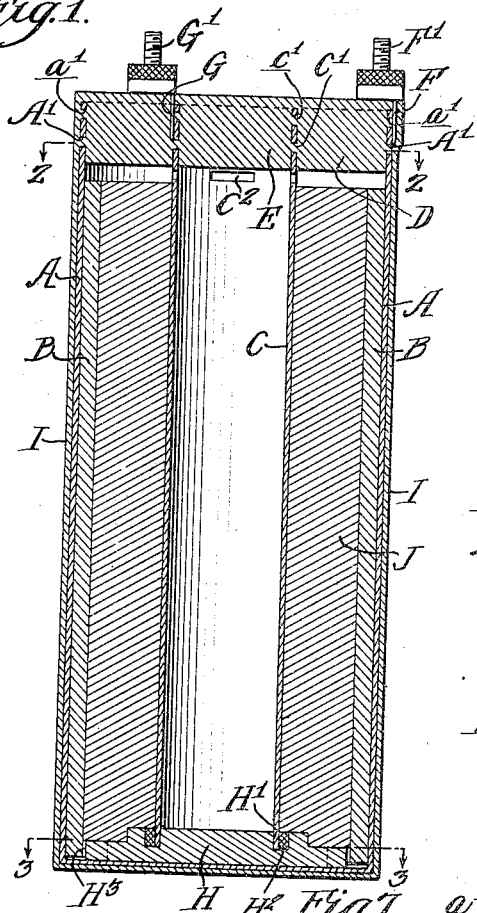
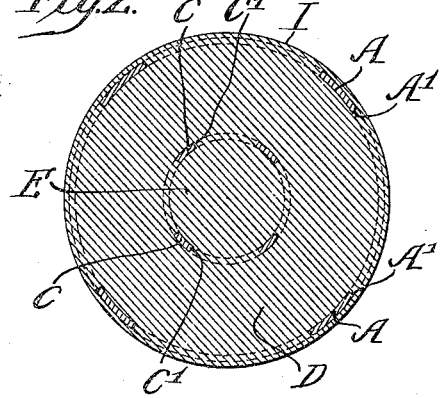
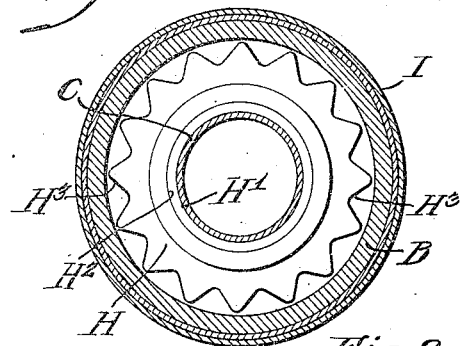
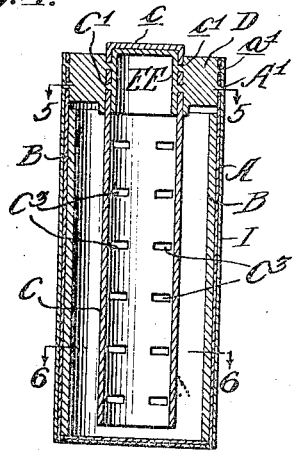
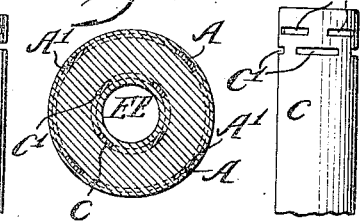
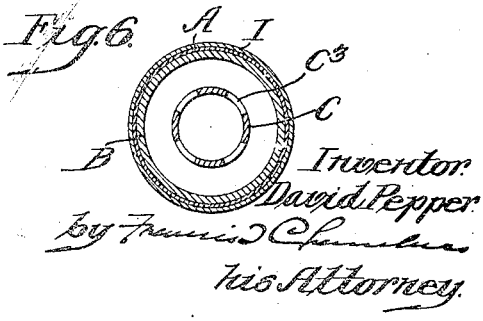
Inventor:
David Pepper
by Francis Chambers
his Attorney Patented Jan. 15, 1924.

1,481,145

UNITED STATES PATENT OFFICE.

DAVID PEPPER, OF PHILADELPHIA, PENNSYLVANIA.

ELECTRIC BATTERY.

Application filed August 7, 1922. Serial No. 580,071.

*To all whom it may concern:*

Be it known that I, DAVID PEPPER, a citizen of the United States of America, residing in the city and county of Philadelphia, in the State of Pennsylvania, have invented a certain new and useful Improvement in Electric Batteries, of which the following is a true and exact description, reference being had to the accompanying drawings, which form a part thereof.

My invention relates to the construction of electric batteries and has for its object to provide for a better sealing of the batteries and also to provide in batteries of a certain type an improved and capacious gas chamber. The nature of my improvements will be best understood as described in connection with the drawings in which they are illustrated and in which—

Figure 1 is a sectional elevation of a battery embodying my improvements,

Figure 2 being a cross sectional view on the line 2—2 of Fig. 1,

Figure 3, a cross section on the line 3—3 of Fig. 1,

Figure 4, a sectional elevation of a modified type of battery, also embodying my improved sealing improvements, Figure 5, a cross section on the line 5—5 of Fig. 4, Figure 6, a cross section on the line 6—6 of Fig. 4.

Figure 7 is an elevation of the upper part of the cup shaped container which is a feature of both forms of battery illustrated, and Figure 8 is an elevation of the upper part of the tubular electrode shown in Fig. 4, and which differs only from the tubular electrode shown in Fig. 1 in that it is formed into a cup by having its upper end closed while the inner electrode in Fig. 1 is closed by a plug.

A indicates the cup shaped container which I form of thin walled lead and which, in accordance with my invention, has its upper end perforated, the perforations being preferably formed, as shown, of two rings of elongated slots indicated at A' and a' set staggering to each other and so as to overlap, as shown. B is a layer of active material; in the form of battery shown, lead peroxide laid in close mechanical and electrical connection to the inside of the lead cup. C is the inner electrode formed of a zinc tube which may or may not be cup shaped, as shown in Fig. 4, where the top of the tube is closed, as indicated at c. In all cases, in accordance with my present invention, the upper end of the tubular zinc electrode is perforated, preferably, as shown, by two rings of elongated slots formed and arranged so that the slots of the two rings are staggered with respect to each other and overlap, as indicated at C' and c'.

In the form of battery illustrated in Fig. 1, one or more perforations C² are also formed through the upper part of the tubular zinc electrode in a position which will bring said perforation or perforations below the level of the plug which closes the upper end of the tubular electrode. In the form of battery shown in Fig. 1, no other perforations are formed in the tubular inner electrode but in the form of battery shown in Fig. 4, perforations, as indicated at C³, are formed in the lower portion of the tubular electrode so as to permit the electrolyte to have free access both to the inside and outside of this electrode. D is an annular plug of somewhat plastic material which is formed around the perforated top of the tubular zinc electrode C and which extends into the slots indicated at C', c'. E is a plug of similar plastic material fitted into the top of the tubular zinc electrode, as shown, and connected with the outer annular plug D through the slotted perforations. Preferably, these plugs are melted under some pressure in and around the top of the tubular electrode before it is inserted into the container. The construction shown in Fig. 4 is similar to that shown in Fig. 1 except that the inner plug here indicated at E, E, not being required to close the top of the electrode, is preferably formed cup shaped, as indicated. F indicates the contact plate in electrical connection with the top of the cup A and with a binding post F'. G is a similar contact plate in electrical connection with the top of the inner electrode and with the binding post G'. H, Figs. 1 and 3, indicates a plug for closing the lower end of the tubular inner electrode, being provided for this purpose with a plug-like extension H' which fits with sufficient closeness into the bottom of the tubular electrode and outside of which is formed an annular gutter indicated at H² to receive amalgam. For the purpose of centering and steadying the inner electrode the plug H is continued laterally and preferably formed with staggered edges, as indicated at H³, which come in contact, or approximately so, with the peroxide layer B, as shown. I is an outer layer or coat of plastic, non-conducting material which, as shown, surrounds the cup shaped lead container but which at least should cover the upper edge of this container so as to form a union with the plug D through the slotted perforations A', a', in the top of the container. J, Fig. 1, indicates the electrolyte which is preferably and usually of a jelly like consistency. I have not indicated the presence of the electrolyte in Fig. 4, but it will be understood that, owing to the perforations in the zinc electrode, the electrolyte will be present both around and within the zinc electrode.

As I have stated, the plugs D and E, as shown in Fig. 1, or D and EE, as shown in Fig. 4, are preferably melted around and in the top of the tubular electrode prior to its insertion in the battery, the melting being under such conditions as to temperature and pressure as to insure a perfect union of the inner and outer plugs through the staggered perforations in the top of the electrode. When so constructed and after the electrolyte has been introduced into the container the tubular electrode is inserted and the plug B pressed into the top of the lead cup shaped container, the parts being of such dimensions that deformation of the plug D will occur, by reason of its insertion into the cup so that some portions of the plug are pressed into the perforations A' and a'. The outer plastic layer I is then pressed around the top of the cup shaped container so as to form a union with the plug D through the perforations.

It will, of course, be obvious that it is practicable and that the advantages of my new construction will be obtained if the plugs are formed in the top of the battery after it is assembled by casting, as is now the usual practice.

In the construction shown in Fig. 1, the bottom of the tubular zinc electrode being closed by the plug or plate H, the electrolyte is excluded from the inside of the tubular electrode and in charging the battery care must be had that the quantity of electrolyte is such that it will reach the level of the perforation C² when the parts of the battery are fully assembled, this perforation C² being open, affords a free passage for gas generated in the outer portion of the battery into the capacious interior of the tubular electrode C which thus affords a relief chamber, preventing the pressure of the gas from reaching a dangerous point where it might tend to blow the plug out of the battery.

In its general make-up the battery illustrated and above described embodies other features which I believe to be new with me and which are claimed in my pending application filed August 9, 1921, Serial No. 490,858.

Having now described my invention, what I claim as new and desire to secure Letters Patent, is:

1. An electric battery having a cup shaped container, an inner electrode of tubular form having openings formed through its wall at its top, and an annular sealing plug of plastic material surrounding the perforated upper end of the tubular electrode and extending into the perforation therein and fitting in the upper end of the container.

2. An electric battery having a cup shaped container, having openings formed through its upper end, an inner electrode of tubular form having openings formed through its wall at its top, and an annular sealing plug of plastic material surrounding the perforated upper end of the tubular electrode and extending into the perforation therein and fitting in the upper perforated end of the container.

3. An electric battery having a cup shaped container, an inner electrode of tubular form having openings formed through its wall at its top, an annular sealing plug of plastic material surrounding the perforated upper end of the tubular electrode and extending into the perforation therein and fitting in the upper end of the container and an inner plug of plastic material in the upper end of the tubular electrode united by pressure with the outer plug through the perforation in the electrode.

4. An electric battery having a cup shaped container having openings formed through its upper end, an inner electrode of tubular form having openings formed through its wall at its top, an annular sealing plug of plastic material surrounding the perforated upper end of the tubular electrode and extending into the perforation therein and fitting in the upper perforated end of the container and an outer ring of plastic material surrounding the perforated top of the container and united with the plug through the perforations in the container.

5. An electric battery having a cup shaped container, an inner electrode of tubular form having a plurality of openings formed through its top in the form of rings of elongated slotted openings, the slots of adjacent rings being staggered and overlapping with respect to each other, an annular sealing plug of plastic material surrounding the perforated upper end of the tubular electrode and extending into the perforation therein and fitting in the upper end of the container.

6. An electric battery having a cup shaped container having a plurality of openings formed through its top in the form of rings of elongated slots, the slotted openings of each ring being staggered and overlapping with respect to the slots of adjacent rings, an inner electrode of tubular form having a plurality of openings formed through its top in the form of rings of elongated slotted openings, the slots of adjacent rings being staggered and overlapping with respect to each other, an annular sealing plug of plastic material surrounding the perforated upper end of the tubular electrode and extending into the perforation therein and fitting in the upper end of the container.

7. An electric battery having a cup shaped container, an inner electrode of tubular form having a closed bottom, unperforated side walls extending from the closed bottom to a point above the level of the electrolyte, and an opening in its upper portion located below the sealing plug and above the level of the electrolyte, a sealing plug surrounding the upper end of the tubular electrode and fitting in the top of the container and an electrolyte contained in the space between the container and tubular electrode.

8. An electric battery having a cup shaped container having two annular rings of slotted and staggered openings formed through its top, an inner electrode of tubular form having a closed bottom, two rows of slotted staggered openings formed through its top and an opening in its upper portion located below the sealing plug and above the level of the electrolyte, a sealing plug surrounding the upper end of the tubular electrode and fitting in the top of the container, said sealing plug extending into the slotted openings in the container and electrode and an electrolyte contained in the space between the container and tubular electrode.

DAVID PEPPER.